United States Patent
Lafrenz et al.

(10) Patent No.: US 8,616,557 B2
(45) Date of Patent: Dec. 31, 2013

(54) MULTILAYER GASKET WITH SEGMENTED INTEGRAL STOPPER FEATURE

(75) Inventors: Christopher J Lafrenz, Shelby Township, MI (US); Edward Lesnau, IV, Livonia, MI (US)

(73) Assignee: Federal-Mogul Corporation, Southfield, MI (US)

( * ) Notice: Subject to any disclaimer, the term of this patent is extended or adjusted under 35 U.S.C. 154(b) by 95 days.

(21) Appl. No.: 13/267,020

(22) Filed: Oct. 6, 2011

(65) Prior Publication Data

US 2013/0087980 A1    Apr. 11, 2013

(51) Int. Cl.
*F02F 11/00* (2006.01)

(52) U.S. Cl.
USPC .......................................................... 277/593

(58) Field of Classification Search
USPC .......... 277/591, 592, 593, 594, 595, 601, 639
See application file for complete search history.

(56) References Cited

U.S. PATENT DOCUMENTS

| | | | | |
|---|---|---|---|---|
| 3,653,673 | A * | 4/1972 | Green | 277/612 |
| 4,723,783 | A * | 2/1988 | Belter et al. | 277/592 |
| 5,022,661 | A * | 6/1991 | Nakasone | 277/591 |
| 5,580,065 | A * | 12/1996 | Ueta | 277/591 |
| 6,113,110 | A * | 9/2000 | Hasegawa | 277/593 |
| 6,186,513 | B1 * | 2/2001 | Udagawa | 277/593 |
| 6,250,645 | B1 * | 6/2001 | Udagawa | 277/595 |
| 6,257,591 | B1 * | 7/2001 | Abe et al. | 277/591 |
| 6,685,197 | B1 * | 2/2004 | Rakauskas | 277/651 |
| 6,769,696 | B2 * | 8/2004 | Diez et al. | 277/593 |
| 6,926,282 | B2 * | 8/2005 | Werz et al. | 277/591 |
| 7,073,795 | B2 * | 7/2006 | Ueta et al. | 277/591 |
| 7,086,651 | B2 * | 8/2006 | Zerfass et al. | 277/592 |
| 7,367,566 | B2 * | 5/2008 | Udagawa et al. | 277/593 |
| 7,913,386 | B2 * | 3/2011 | Werz et al. | 29/888.3 |
| 7,959,160 | B2 * | 6/2011 | Murata et al. | 277/592 |
| 7,984,912 | B2 * | 7/2011 | Schneider et al. | 277/593 |

(Continued)

FOREIGN PATENT DOCUMENTS

| | | |
|---|---|---|
| DE | 3526817 A1 | 2/1987 |
| EP | 1635093 | 3/2006 |

(Continued)

OTHER PUBLICATIONS

International Search report PCT/US2012/058880 mailed on Jan. 22, 2013.

*Primary Examiner* — Vishal Patel
*Assistant Examiner* — L. Susmitha Koneru
(74) *Attorney, Agent, or Firm* — Robert L. Stearns; Dickinson Wright, PLLC (57) ABSTRACT

A multilayer metal gasket (40) having first (28) and second (30) functional layers. Each layer (28, 30) includes an opening (34, 38). Sealing beads (42, 44) are formed in each layer (28, 30) and, preferably, arranged to contact each other in crest-to-crest orientation to perfect a seal therebetween. A stopper feature (54) is provided to restrict compression of the sealing beads (42, 44) in use. The stopper feature (54) is arranged in a generally circular pattern and is composed of a plurality of discrete nesting embossments (56) which are closely spaced to one another but do not touch. Each discrete nesting embossment (56) is substantially identical in shape to the next adjacent discrete nesting embossment (56) but oriented approximately 180 degrees therefrom. The embossments (56) may be formed entirely on one of the functional layers (28, 30) or on both functional layers.

17 Claims, 5 Drawing Sheets

(56) References Cited

U.S. PATENT DOCUMENTS

| | | | |
|---|---|---|---|
| 8,382,122 B2 * | 2/2013 | Ueda et al. | 277/592 |
| 2001/0048202 A1 * | 12/2001 | Zerfab et al. | 277/592 |
| 2002/0020970 A1 * | 2/2002 | Miyaoh et al. | 277/592 |
| 2002/0050687 A1 * | 5/2002 | Ogaeri et al. | 277/591 |
| 2003/0006565 A1 * | 1/2003 | Inamura et al. | 277/592 |
| 2004/0160017 A1 * | 8/2004 | Diez et al. | 277/593 |
| 2004/0183259 A1 * | 9/2004 | Zerfass et al. | 277/592 |
| 2005/0110223 A1 * | 5/2005 | Pepin | 277/598 |
| 2005/0189724 A1 | 9/2005 | Schmitz | |
| 2006/0119050 A1 * | 6/2006 | Tripathy et al. | 277/592 |
| 2007/0013145 A1 * | 1/2007 | Detmann et al. | 277/593 |
| 2008/0023922 A1 * | 1/2008 | Umehara | 277/592 |
| 2009/0166985 A1 * | 7/2009 | Hohe et al. | 277/592 |
| 2009/0189359 A1 * | 7/2009 | Yoshijima et al. | 277/591 |
| 2009/0267308 A1 * | 10/2009 | Schmucker | 277/592 |
| 2010/0117306 A1 * | 5/2010 | Okuno et al. | 277/592 |
| 2010/0176558 A1 * | 7/2010 | Egloff et al. | 277/591 |
| 2010/0225068 A1 * | 9/2010 | Imai | 277/591 |
| 2011/0095489 A1 * | 4/2011 | Fatora et al. | 277/592 |
| 2011/0204580 A1 * | 8/2011 | Tripathy | 277/593 |
| 2012/0098210 A1 * | 4/2012 | Schmitt et al. | 277/593 |
| 2012/0227698 A1 * | 9/2012 | Tripathy | 123/193.1 |

FOREIGN PATENT DOCUMENTS

| | | |
|---|---|---|
| EP | 1852638 | 11/2007 |
| JP | 6221443 A | 8/1994 |
| WO | 2008004723 | 1/2008 |
| WO | 2008082023 | 7/2008 |
| WO | 2010149774 | 12/2010 |

* cited by examiner

MULTILAYER GASKET WITH SEGMENTED INTEGRAL STOPPER FEATURE

CROSS REFERENCE TO RELATED APPLICATIONS

None.

BACKGROUND OF THE INVENTION

1. Field of the Invention

This invention relates to multilayer gaskets, and more particularly to multilayer metal gaskets including a stopper for limiting compression height of the gasket when installed between two mating surfaces.

2. Related Art

Figure 1:
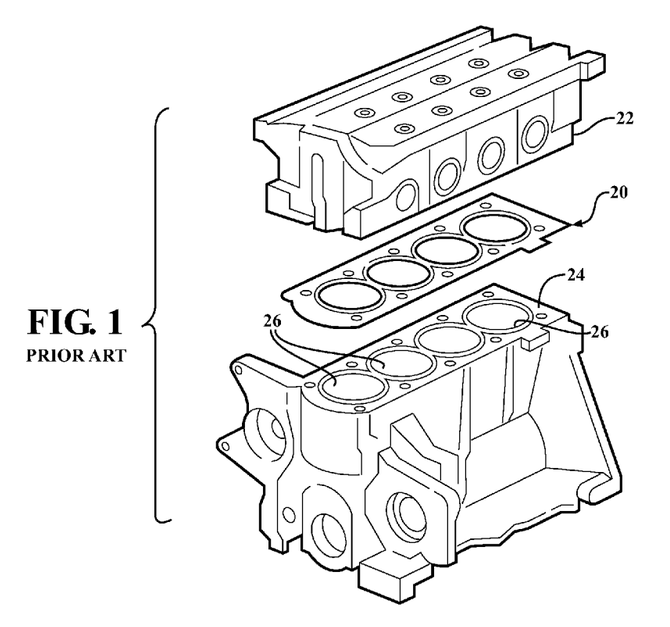
FIG. 1 shows a prior art engine assembly partially exploded with a multilayer gasket disposed between an engine block and cylinder head.
Figure 2:
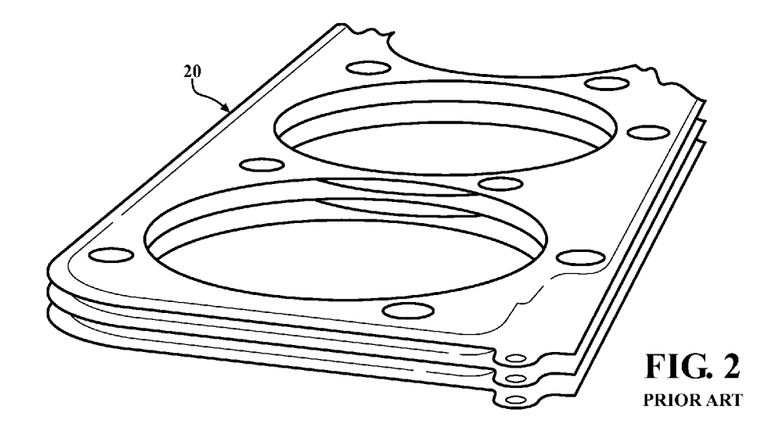
FIG. 2 is an enlarged, fragmentary view of a multilayer cylinder head gasket according to the prior art.

Multilayer metal gaskets, also referred to by some as multilayer steel (MLS) gaskets, are commonly used in static sealing applications that require a fluid-tight seal to be created around a passage shared by two mating members. For example, an MLS gasket, generally indicated at 20 in FIG. 1, may be clamped between a cylinder head 22 and an engine block 24 to perfect a combustion seal around multiple combustion chambers 26 as well as around oil and lubrication passages shared by the two mating members 22, 24. However, multilayer metal gaskets can also be used in other applications, such as to seal an exhaust manifold to an engine block, as well as other engine and non-engine applications. An enlarged fragmentary view of a prior art multilayer gasket 20 is shown in FIG. 2. Frequently, cylinder head gaskets 20 like that shown in FIGS. 1 and 2 include multiple bore openings to correspond with multiple combustion chambers 26 in an engine block 24. The constant transition between compression and expansion in adjacent cylinders creates substantial cyclic pressure differentials that make sealing combustion gases difficult. As a result, it is common for some combustion gases to leak through the multiple layers of the gasket 20 over time, resulting in some loss of engine efficiency.

Multilayer gaskets are particularly useful in applications that require a minimal thickness gasket capable of sealing effectively under fairly low and/or highly variable contact pressures. US Publication No. 2005/0189724, assigned to the assignee of this invention, the entire disclosure of which is hereby incorporated by reference, discloses a multilayer metal gasket including first and second functional layers formed with respective openings that coincide with a cylinder chamber. The functional layers include opposed sealing beads around the opening, together with an interposed stopper layer serving as a compression limiting feature to establish a final, i.e., fully compressed, assembled height.

One shortcoming of many prior art multilayer gasket designs may be attributed to the high cost of the stopper feature which is typically either formed of integral folds or separately formed and then attached by laser welding or some other technique. Both the fold-over stoppers and loose piece formation stoppers increase manufacturing costs, material handling complexities and increase manufacturing time. For these reasons and others, there is a need for new and improved multilayer gaskets that will meet the quality and operational characteristics demanded by modern engine technology while reducing cost and/or fabrication complexity.

SUMMARY OF THE INVENTION

A multilayered gasket assembly is provided of the type for sealing around a passage or chamber formed between two mating members. The mating members may, for example, comprise a cylinder block and cylinder head for an internal combustion engine. The gasket assembly includes a first functional layer having at least one first opening. The first functional layer includes a resilient and compressible first sealing bead spaced apart from and surrounding the first opening. The first functional layer includes a first stopper region adjacent the first sealing bead. A second functional layer is provided having at least one second opening. The second functional layer includes a resiliently compressible second sealing bead spaced apart from and surrounding the second opening. The second functional layer includes a second stopper region adjacent the second sealing bead. The first functional layer overlies the second functional layer so that the respective first and second openings are generally aligned with one another and so that the respective first and second stopper regions are generally aligned with one another. The first sealing bead and the second sealing bead are configured to, in use, resiliently oppose one another. A stopper feature is disposed in the stopper region of at least one of the first and second functional layers for the purpose of limiting compression of the first and second functional layers toward each other in use. The stopper feature operates to restrict the first and second sealing beads to partial compression. The stopper feature includes a plurality of discrete nesting embossments formed integrally from at least one of the first and second functional layers. Each nesting embossment is closely spaced to but not touching the next adjacent discrete nesting embossment in a radially overlapping relationship. The discrete nesting embossments can be easily manufactured directly from either or both of the first and second functional layers thereby obviating the need for a complex fold-over stopper or a separately manufactured, loose-piece stopper member as is common in prior art constructions.

According to another aspect of this invention, the above-described gasket assembly is combined with an internal combustion engine of the type including a block and a cylinder head. At least one combustion chamber is formed in the block. The combustion chamber is defined by a cylindrical sidewall. The gasket assembly with a stopper feature comprised of discrete nesting embossments is operatively disposed between the block and the cylinder head to, in use, seal combustion gases within the combustion chamber.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 3:
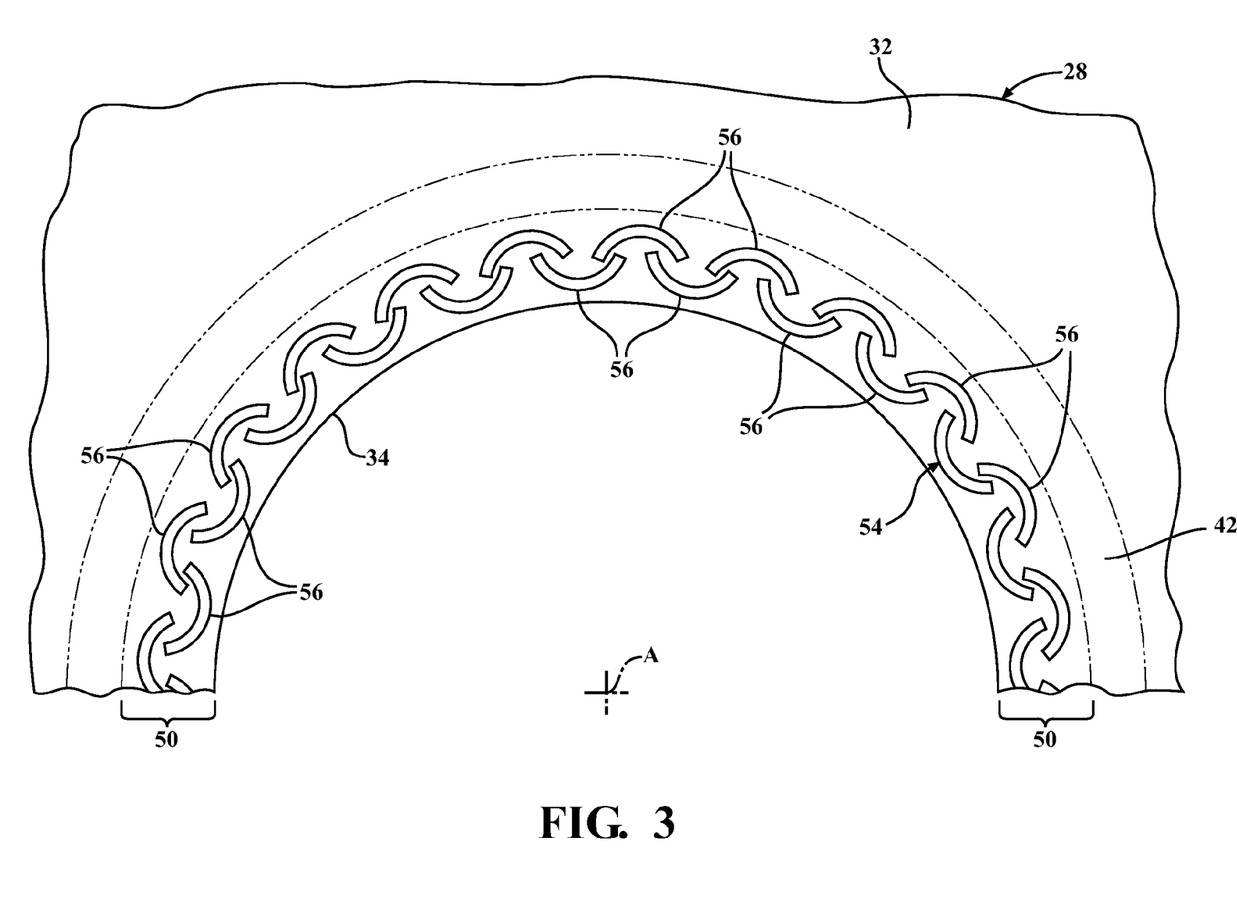
FIG. 3 is a fragmentary top view of a functional layer for a multilayer gasket assembly according to this invention illustrating the formation of a stopper feature having a plurality of discrete nesting embossments disposed in a generally circular array about a combustion chamber opening.
Figure 4:
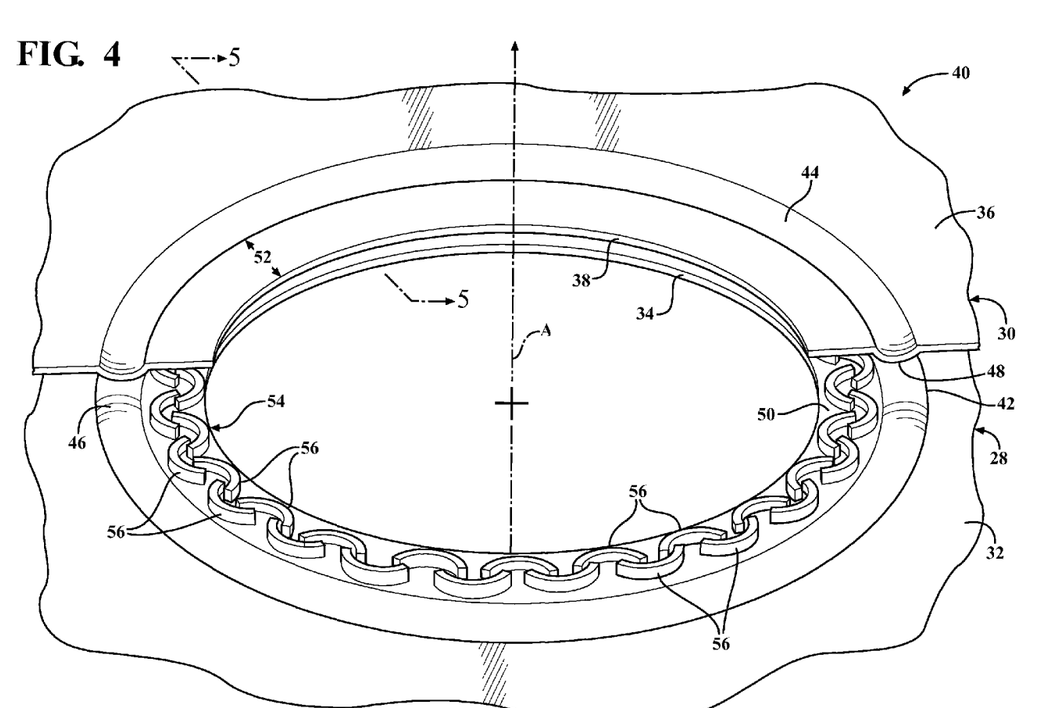
FIG. 4 is a fragmentary perspective view of a gasket assembly according to this invention wherein a stopper feature having a plurality of discrete nesting embossments is shown formed integrally on a first functional layer and showing a second functional layer in partial cross-section to illustrate the relative alignment of layers in use.
Figure 5:
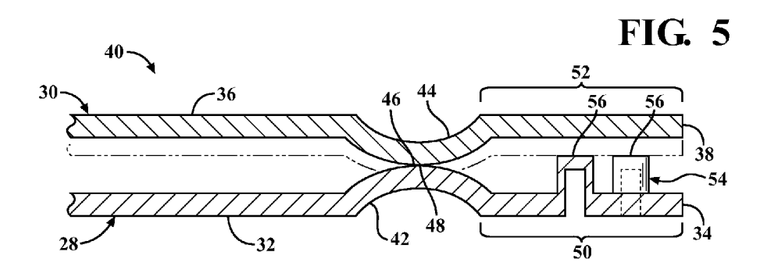
FIG. 5 is a simplified cross-sectional view as taken generally along lines 5-5 of FIG. 4.

Referring to the figures wherein like numerals indicate like or corresponding parts throughout the several views, a multilayer gasket according to one embodiment of this invention is generally shown at 40 in FIGS. 3-5. The gasket assembly 40 includes a first functional layer, generally indicated at 28, and a second functional layer, generally indicated at 30. The first functional layer 28 comprises a generally planar body 32 having a generally uniform thickness formed from a sheet of suitable metallic material. A first opening 34 is formed in the first layer 28 for sealing around a shared passage between the two mating members, such as around a combustion chamber opening 26 between the cylinder head 22 and block 24. The second functional layer 30 may be similar in construction to the first layer 28 and also comprises a generally planar second body 36 and a second opening 38. Assembled together as a unit, the first 28 and second 30 layers form the gasket assembly 40. In the assembly 40, the first 28 and second 30 layers overlie one another such that the respective first 34 and second 38 openings are generally aligned. In cases where the openings 34, 38 can be defined relative to an axis, such as for the circular openings 34, 38 corresponding to a combustion chamber 26, the two layers 28, 30 may be said to be aligned along a laterally extending axis. In several Figures, this axis is identified by the letter "A" which generally coincides with the reciprocating axis of a piston operating inside the associated combustion chamber 26.

Figure 7:
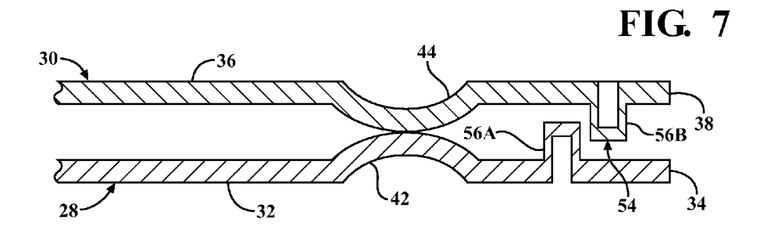
FIG. 7 is a cross-sectional view like that of FIG. 5 but showing the first alternative embodiment with alternating discrete nesting embossments formed in the respective first and second functional layers.

The gasket assembly 40 includes at least one, but preferably at least two, sealing beads 42, 44 encircling the openings 34, 38, respectively. The sealing beads 42, 44 are resiliently compressible features typically formed integrally with the first 28 and second 30 functional layers, respectively, to provide a spring-like function well known to those of skill in this art. Alternatively, one or both of the sealing beads 42, 44 may be carried on intermediate or non-functional layers of the gasket assembly 40. Also alternatively, the sealing beads 42, 44 may be separately formed and attached to the functional layers 28, 30, or to intermediate non-functional layers. Preferably, both sealing beads 42, 44 oppose one another and work in concert to enhance the sealing functionality of the gasket assembly 40. In particular, the first layer 28 includes an integrally formed first sealing bead 42 spaced apart from the first opening 34. Likewise, the second layer 30 includes a second sealing bead 44 spaced apart from its second opening 38. In situations where the respective openings 34, 38 are circular, as is typical in cylinder head gasket applications for an example, the sealing beads 42, 44 are also preferably circular although other geometries are certainly possible. When viewed in cross-section as in FIGS. 5 and 7, the sealing beads 42, 44 in this embodiment are shown to have a semi-circular shape, each including a crest 46, 48, respectively. The crest 46 of the first sealing bead 42 is laterally offset from its planar body 32. The lateral offset is measured in the direction of the axis. A Likewise, crest 48 of the second sealing bead 44 is laterally offset from the second planar body 36. In one preferred embodiment, the first sealing bead 42 is laterally offset from the first layer 28 in a direction opposite to that of the second sealing bead 44, and more particularly the two sealing beads 42, 44 are arranged so that their respective crests 46, 48 touch one another in the space between the two layers 28, 30 as shown in FIGS. 4, 5 and 7. It will be understood that one or more non-functional layers may be placed between the two functional layers 28, 30 preventing direct crest-to-crest contact but otherwise not altering the functionality of the beads 42, 44 in this arrangement.

The first functional layer 28 includes a first stopper region 50 adjacent the first sealing bead 42. As shown in FIGS. 3-5, the first stopper region 50 comprises that section of the planar body 32 lying between the first opening 34 and the first sealing bead 42. In other words, the first stopper region 50 in one preferred embodiment is that space or portion of the first functional layer 28 disposed radially inwardly from the first sealing bead 42. Those of skill in this art may recognize that placement of the first stopper region 50 may, in some cases, be acceptably relocated to the radially outward portions of the first sealing bead 42. Likewise, the second functional layer 30 includes a second stopper region 52 of comparable specifications. A stopper feature, generally indicated at 54, is disposed in the stopper region 50, 52 of at least one of the first 28 and second 30 functional layers. The stopper feature 54 functions to limit compression of the first 28 and second 30 functional layers toward each other in use. That is to say, the resiliently compressible nature of the first 42 and second 44 sealing beads is partially constrained by the stopper feature 54 so that the respective planar bodies 32, 36 of the first 28 and second 30 functional layers cannot be brought to bear in face-to-face contact with one another. Rather, contact is limited to defined portions of each functional layer 28, 30, with the exception of optional intermediate layers (not shown), to the stopper feature 54 and sealing beads 42, 44. Thus, the stopper feature 54 in customary fashion prevents over-compression of the gasket assembly in use.

The stopper feature 54 includes a plurality of discrete nesting embossments 56 formed integrally from at least one of the first 28 and second 30 functional layers. Each nesting embossment 56 is closely spaced to, but not touching, the next adjacent discrete nesting embossment 56 in a radially overlapping relationship. The term "radially overlapping relationship" may be understood to describe an imaginary radial line extending from the axis A through the stopper feature 54 that may at some but perhaps not all locations intersect two adjacent embossments 56. Thus, the embossments 56 can be said to overlap one another with no radial pass-through gaps being presented. Nevertheless, each embossment 56 is distinct and free from contact with the next adjacent embossment 56 so that the entire stopper feature 54 is circumferentially discontinuous.

As perhaps best shown in FIG. 3, each discrete nesting embossment 56 is substantially identical in shape to the next adjacent discrete nesting embossment 56 but with a different orientation. More specifically, each embossment 56 is oriented approximately 180 degrees relative to the next adjacent nesting embossment 56, with the exception of a slight circumferential offset. For example, if a particular stopper feature 54 is composed of forty-eight equally spaced discrete nesting embossments 56, then it is the case that each embossment 56 will be spaced 7.5 degrees (on center) from the next adjacent embossment 56. (360/48=7.5 degrees) As a result, any given embossment 56 is oriented 187.5 degrees (180+7.5=187.5) relative to the next adjacent embossment 56. In this example, 7.5 degrees is the slight circumferential offset. Said another way, the orientation of each embossment 56 relative to the axis A is maintained in every other embossment 56, with the intervening embossments 56 oriented 180 degrees relative thereto. The result is an overlapping, chain-like construction through which combustion gases (when applied in the exemplary context of a cylinder head gasket) are never permitted direct access to the sealing beads 42, 44, but rather are forced in a tortuous path thereby protecting the sealing beads 42, 44.

FIG. 5 describes a preferred shape and implies a preferred manufacturing technique to achieve the discrete nesting embossments 56. Namely, the discrete nesting embossments 56 are preferably formed integrally in the first functional layer 28 using a metal stamping operation or other similar deformation or shaping process, so that the embossments 56 may be quickly, accurately and integrally formed from the base material of the first functional layer 28. Also shown in FIG. 5 for purposes of illustration are the relative displacement of the second functional layer 30 by way of phantom lines showing that, in use, the flat distal ends of the embossments 56 limit the compression of the sealing beads 42, 44 and thus the displacement of the second functional layer 30 for optimal performance of the gasket assembly 40.

Figure 6:
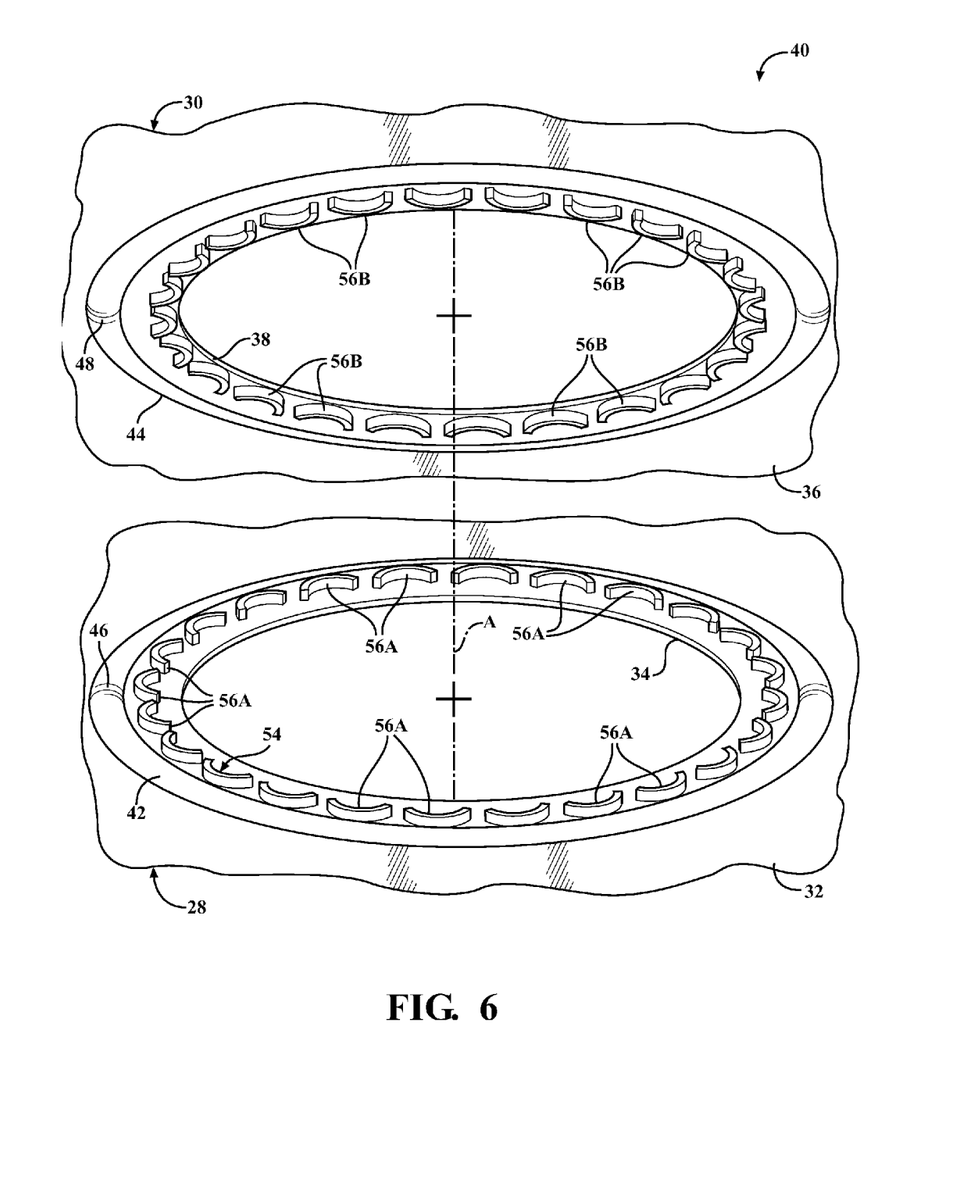
FIG. 6 is a perspective view showing a first alternative embodiment of the subject invention wherein every other discrete nesting embossment is formed integrally on the first functional layer while the remaining discrete nesting embossments are formed integrally on the second functional layer so that when the two layers are brought together in use, a complete stopper feature is established.

FIGS. 6-7 depict a first alternative embodiment of the subject invention wherein the discrete nesting embossments are identified by the groups 56A and 56B. Each discrete nesting embossment 56A is flanked on its immediate adjacent sides by a discrete nesting embossment from the group 56B and vice versa. As will be seen by inspection of the referenced drawing figures, the group of embossments 56A are formed integrally from the first functional layer 28 whereas the remaining discrete nesting embossments from the group 56B are formed integrally from the second functional layer 30. In this way, approximately half of the embossments 56A are formed on one functional layer 28 and the other half of the embossments 56B are formed on the other functional layer 30. The radially overlapping nesting relationship described above naturally facilitates the respective placement of the embossments on distinct functional layers 28, 30. Furthermore, from a manufacturing perspective, it may be desirable to separately form every other embossment 56 on a different layer 28, 30 to improve the quality of the embossments 56 and facilitate various other manufacturing considerations common to the metal deforming arts. In the second alternative embodiment, it will be appreciated that the semi-circular shape of each embossment 56A, 56B remains generally identical to the embossment 56 shape used in the preferred embodiment shown in FIGS. 3-5.

Figure 8:
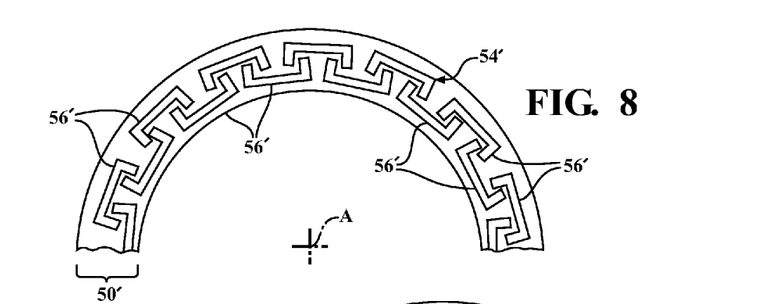
FIG. 8 is a fragmentary top view of a stopper feature according to a second alternative embodiment of the invention wherein the discrete nesting embossments have a generally rectilinear U-shaped configuration.
Figure 9:
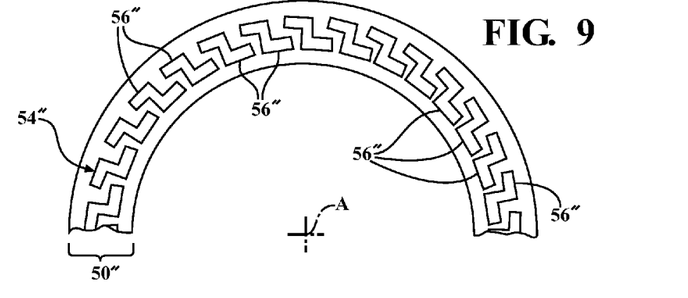
FIG. 9 is a view as in FIG. 8 but of a third alternative embodiment wherein the discrete nesting embossments have a generally Z-shaped configuration.

FIGS. 8 and 9, illustrate second and third alternative embodiments, respectively. In the second alternative embodiment of FIG. 8, the discrete nesting embossments 56' are shown having a rectilinear U-shape as opposed to the shallow curving U-shape illustrated in preceding embodiments. The third alternative embodiment of FIG. 9 represents an example where the shape of each discrete nesting embossment 56" is akin to the letter "Z." These few examples are intended to represent but a small sampling of the many varieties of shapes possible with which to form the embossments. As will be seen in the alternative embodiments of FIGS. 8 and 9, it remains the case that the discrete nesting embossments are positioned in radially overlapping relationships, and that each nesting embossment is substantially identical in shape to the next adjacent embossment but oriented approximately 180 degrees therefrom. The embossments are also preferably, but not necessarily, equally circumferentially spaced. In all illustrated cases, the stopper feature is arranged in a generally circular pattern about the first 34 and second 38 openings and composed of a plurality of discrete nesting embossments.

The discrete nesting embossments 56 described among the various alternative embodiments is relatively easy to fabricate and inexpensive in that it is formed integrally from either or both of the functional layers 28, 30. The arrangement of the embossments 56 is such that they are closely spaced and radially overlapping, with each embossment being oriented approximately 180 degrees relative to the next adjacent embossment to provide a discontinuous yet effective barrier to protect the sealing beads 42, 44 from the assault of combustion gases (in the example of a combustion engine application).

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A multi-layered gasket assembly of the type for sealing around a passage or chamber formed between two mating members, said gasket assembly comprising:

a first functional layer having at least one first opening, said first functional layer including a resiliently compressible first sealing bead spaced apart from and surrounding said first opening, said first functional layer including a first stopper region adjacent said first sealing bead;

a second functional layer having at least one second opening, said second functional layer including a resiliently compressible second sealing bead spaced apart from and surrounding said second opening, said second functional layer including a second stopper region adjacent said second sealing bead;

said first functional layer overlying said second functional layer such that said respective first and second openings are generally aligned with one another and such that said respective first and second stopper regions are generally aligned with one another, said first sealing bead and said second sealing bead being configured to, in use, resiliently oppose one another;

a stopper feature disposed in said stopper region of at least one of said first and second functional layers for limiting compression of said first and second functional layers toward each other in use whereby said first and second sealing beads are restricted to partial compression by said stopper feature;

and said stopper feature including a plurality of discrete nesting embossments formed integrally from at least one of said first and second functional layers, each said nesting embossment being closely spaced to but not touching the next adjacent said discrete nesting embossment in a radially overlapping relationship, each of said embossments having a pair of ends separated from one another by an embossment opening, and wherein said ends of each embossment are received within said embossment openings of adjacent embossments to provide said stopper feature with a chain-like construction.

2. The gasket assembly of claim 1, wherein each said discrete nesting embossment is substantially identical in shape to the next adjacent said discrete nesting embossment but oriented approximately 180 degrees therefrom.

3. The gasket assembly of claim 2, wherein alternating ones of said discrete nesting embossments are formed integrally from said first functional layer and the remaining said discrete nesting embossments are formed integrally from said second functional layer.

4. The gasket assembly of claim 2, wherein all of said discrete nesting embossments are formed integrally from one of said first and second functional layers.

5. The gasket assembly of claim 1, wherein first functional layer comprising a generally planar body having a generally uniform body thickness, said first functional layer fabricated from a metallic material; second functional layer comprising a generally planar body having a generally uniform thickness, said second functional layer fabricated from a metallic material.

6. The gasket assembly of claim 1, wherein said first sealing bead includes a crest laterally offset from said planar body of said first functional layer, and said second sealing bead includes a crest laterally offset from said planar body of said second functional layer, said crests of said respective first and second functional layers being in direct touching contact with one another.

7. The gasket assembly of claim 1, wherein each said discrete nesting embossment is formed in a metal stamping operation.

8. The gasket assembly of claim 1, wherein said first stopper region is disposed between said first opening and said first sealing bead; and said second stopper region is disposed between said second opening and said second sealing bead.

9. The gasket assembly of claim 8, wherein said first and second openings are generally circular; and wherein, in use, said plurality of discrete nesting embossments of said stopper feature are arranged in a generally circular pattern about said first and second openings.

10. The gasket assembly of claim 8, wherein each said discrete nesting embossment is generally identical to the next adjacent discrete nesting embossment and has a U-shape.

11. A multi-layered gasket assembly of the type of sealing around a passage or chamber formed between two mating members, said gasket assembly comprising:
a first functional layer having at least one first opening, said first functional layer including a resilient compressible first sealing bead spaced apart from and surrounding said first opening, said first functional layer including a first stopper region adjacent said first sealing bead;
a second functional layer having at least one second opening, said second functional layer including a resiliently compressible second sealing bead spaced apart from and surrounding said second opening, said second functional layer including a second stopper region adjacent said second sealing bead;
said first functional layer overlying said second functional layer such that said respective first and second openings are generally aligned with one another and such that said respective first and second stopper regions are generally aligned with one another, said first sealing bead and said second sealing bead being configured to, in use, resiliently oppose one another;
a stopper feature disposed in said stopper region of at least one of said first and second functional layers for limiting compression of said first and second functional layers toward each other in use whereby said first and second sealing beads are restricted to partial compression by said stopper feature;
wherein said first stopper region is disposed between said first opening and said first sealing bead and said second stopper region is disposed between said second opening and said second sealing bead; and
said stopper feature including a plurality of discrete nesting embossments formed integrally from at least one of said first and second functional layers, each said nesting embossment being closely spaced to but not touching the next adjacent said discrete nesting embossment in a radially overlapping relationship, and wherein each said discrete nesting embossment is generally identical to the next adjacent discrete nesting embossment and has a Z-shape.

12. A multi-layered gasket assembly of the type for sealing around a passage or chamber formed between two mating members, said gasket assembly comprising:
a first functional layer comprising a generally planar body having a generally uniform body thickness, said first functional layer fabricated from a metallic material, said first functional layer having at least one first opening, said first functional layer including a resiliently compressible first sealing bead spaced apart from and surrounding said first opening, said first sealing bead including a crest laterally offset from said planar body of said first functional layer, said first functional layer including a first stopper region between said first opening and said first sealing bead;
a second functional layer comprising a generally planar body having a generally uniform thickness, said second functional layer fabricated from a metallic material, said second functional layer having at least one second opening, said second functional layer including a resiliently compressible second sealing bead spaced apart from and surrounding said second opening, said second sealing bead including a crest laterally offset from said planar body of said second functional layer, said second functional layer including a second stopper region between said second opening and said second sealing bead;
said first functional layer overlying said second functional layer such that said respective first and second openings are generally aligned with one another and said respective first and second stopper regions are generally aligned with one another, said first sealing bead being laterally offset from said first functional layer in a direction opposite to the lateral offset of said second sealing bead relative to said second functional layer so that the two said beads resiliently oppose one another;
and a stopper feature disposed in said stopper region of at least one of said first and second functional layers for limiting compression of said first and second functional layers toward each other in use; said stopper feature including a plurality of discrete nesting embossments formed integrally from at least one of said first and second functional layers, each said discrete nesting embossment being substantially identical in shape to the next adjacent said discrete nesting embossment but oriented approximately 180 degrees therefore, each said discrete nesting embossment being closely spaced to the next adjacent said discrete nesting embossment to create a nested and radially overlapping relationship, each of said embossments having a pair of ends separated from one another by an embossment opening, and wherein said ends of each embossment are received within said embossment openings of adjacent embossments to provide said stopper feature with a chain-like construction.

13. The gasket assembly of claim 12, wherein alternating ones of said discrete nesting embossments are formed integrally from said first functional layer and the remaining said discrete nesting embossments are formed integrally from said second functional layer.

14. The gasket assembly of claim 12, wherein all of said discrete nesting embossments are formed integrally from one of said first and second functional layers.

15. An internal combustion engine comprising:
a block having a top deck surface, at least one combustion chamber formed in said block;
a cylinder head adapted for connection to said top deck surface of said block;
multi-layered cylinder head gasket assembly operatively disposed between said block and said cylinder head for establishing a compression seal around said combustion chamber, said gasket assembly comprising:
a) a first functional layer comprising a generally planar body having a generally uniform body thickness, said first functional layer fabricated from a metallic material, said first functional layer having at least one first opening, said first functional layer including a resiliently compressible first sealing bead spaced apart from and surrounding said first opening, said first sealing bead including a crest laterally offset from said planar body of said first functional layer, said first functional layer including a first stopper region between said first opening and said first sealing bead;
b) a second functional layer comprising a generally planar body having a generally uniform thickness, said second functional layer fabricated from a metallic material, said second functional layer having at least one second opening, said second functional layer including a resiliently compressible second sealing bead spaced apart from and surrounding said second opening, said second sealing bead including a crest laterally offset from said planar body of said second functional layer, said second functional layer including a second stopper region between said second opening and said second sealing bead;
c) said first functional layer overlying said second functional layer such that said respective first and second openings are generally aligned with one another and said respective first and second stopper regions are generally aligned with one another, said first sealing bead being laterally offset from said first functional layer in a direction opposite to the lateral offset of said second sealing bead relative to said second functional layer so that the two said beads resiliently oppose one another;
d) and a stopper feature disposed in said stopper region of at least one of said first and second functional layers for limiting compression of said first and second functional layers toward each other in use; said stopper feature including a plurality of discrete nesting embossments formed integrally from at least one of said first and second functional layers, each said discrete nesting embossment being substantially identical in shape to the next adjacent said discrete nesting embossment but oriented approximately 180 degrees therefore, each said discrete nesting embossment being closely spaced to the next adjacent said discrete nesting embossment to create a nested and radially overlapping relationship, and each of said embossments having a pair of ends separated from one another by an embossment opening, and wherein said ends of each embossment are received within said embossment openings of adjacent embossments to provide said stopper feature with a chain-like construction.

16. The gasket assembly of claim 15, wherein alternating ones of said discrete nesting embossments are formed integrally from said first functional layer and the remaining said discrete nesting embossments are formed integrally from said second functional layer.

17. The gasket assembly of claim 15, wherein all of said discrete nesting embossments are formed integrally from one of said first and second functional layers.

* * * * *